Jan. 20, 1948.  W. P. MASON  2,434,666
PLASTIC HOUSING
Filed May 7, 1943  2 Sheets-Sheet 1

INVENTOR
W. P. MASON
BY
ATTORNEY

Jan. 20, 1948.  W. P. MASON  2,434,666
PLASTIC HOUSING
Filed May 7, 1943  2 Sheets-Sheet 2

INVENTOR
W. P. MASON
BY
ATTORNEY

Patented Jan. 20, 1948

2,434,666

UNITED STATES PATENT OFFICE 2,434,666

PLASTIC HOUSING

Warren P. Mason, West Orange, N. J., assignor to Bell Telephone Laboratories, Incorporated, New York, N. Y., a corporation of New York Application May 7, 1943, Serial No. 486,102

1 Claim. (Cl. 177—386)

This invention relates to housings for electrical apparatus and particularly to housings for electromechanical transducers intended for operation beneath the surface of the sea.

The object of the invention is to produce a housing for a transducer which will introduce the minimum hindrance to ultrasonic waves traveling in the sea water to or from the transducer. Due to the fact that such transducers are immersed to considerable depth in sea water and that the device itself must be protected against the sea water, it is usual to place them in a housing and immerse them in a non-corrosive medium such as castor oil. Heretofore metallic housings have been employed and in some cases small sized "windows" or diaphragms of material such as very thin steel sheets or fairly thick sheets of soft rubber have been provided. The metallic housing, however, interferes with the proper transmission of ultrasonic waves to and from the transducer and hence it is desirable to employ some other material having the requisite strength but free from the disadvantages of metal.

Applicant has discovered that many plastic materials, transparent and otherwise, possess transmission characteristics closely approximating those of sea water. In this connection reference is made to the book "Electromechanical transducers and wave filters" by this applicant, published in 1942 by D. Van Nostrand Company, Inc., particular reference being made to the chart on page 247 showing the results of measurements of certain plastics.

A feature of the invention is a housing for an electromechanical transducer comprising a plastic structure having transmission characteristics closely approaching those of water.

Other features will appear hereinafter.

The drawings consist of two sheets having four figures, as follows.

Figure 1:
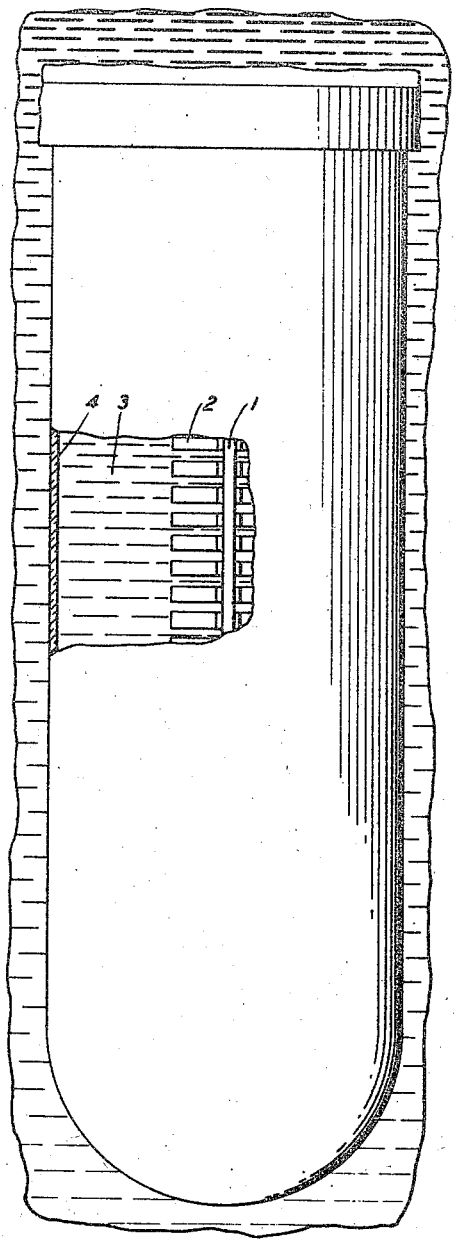
Fig. 1 is a view of a housing, partly broken away to show a part of the housing in section and the location of the transducer.

In Fig. 1 a mounting plate 1 is used as a base to support a plurality of crystals 2 comprising an electromechanical transducer. This assembly is immersed in a non-corrosive fluid 3 such as castor oil and housed in a plastic covering 4 having the general shape of a chemical test tube. Since it has been found that the castor oil and the plastic both have about the same transmission characteristics as sea water, this construction is as nearly as possible equivalent to immersing the transducer directly in sea water with the consequent elimination of the usual losses entailed in the transmission of compressional waves through substances of varying characteristics.

Figure 2:
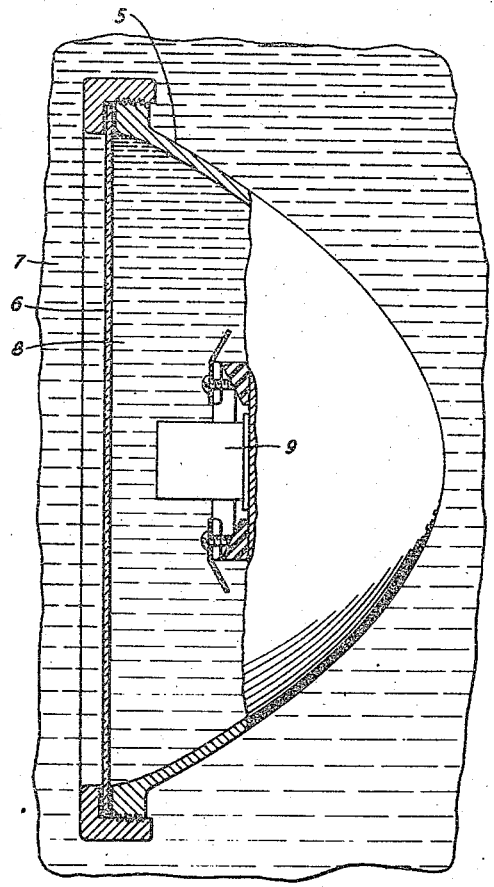
Fig. 2 is a side view of another form of transducer housing, partly broken away to show the location of the various pieces of apparatus.

In Fig. 2 a directional projector or hydrophone is shown. In this instance the main body of the housing 5 may be made of any material but the diaphragm 6 is made of a plastic having the same transmission characteristics as the sea water 7 and the castor oil 8. A crystal 9 represents the transducer.

Figure 3:
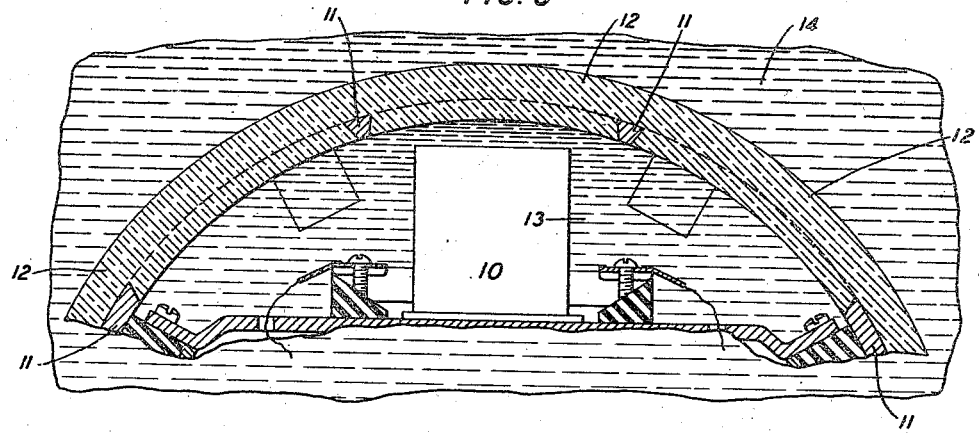
Fig. 3 is a fragmentary sectional view of a transducer and its housing of a different form.

In Fig. 3 there is shown a fragmentary section of a device intended to be placed in a stationary position. A crystal 10 represents a transducer and this with other apparatus is mounted in a cylindrical shell 11 of metal having a plurality of windows cut out. These windows, as well as a layer over the outside of the shell, are formed of a plastic 12 which has the same transmission characteristics as the castor oil 13 in which the apparatus is immersed and the sea water 14 which surrounds the assembly.

Figure 4:
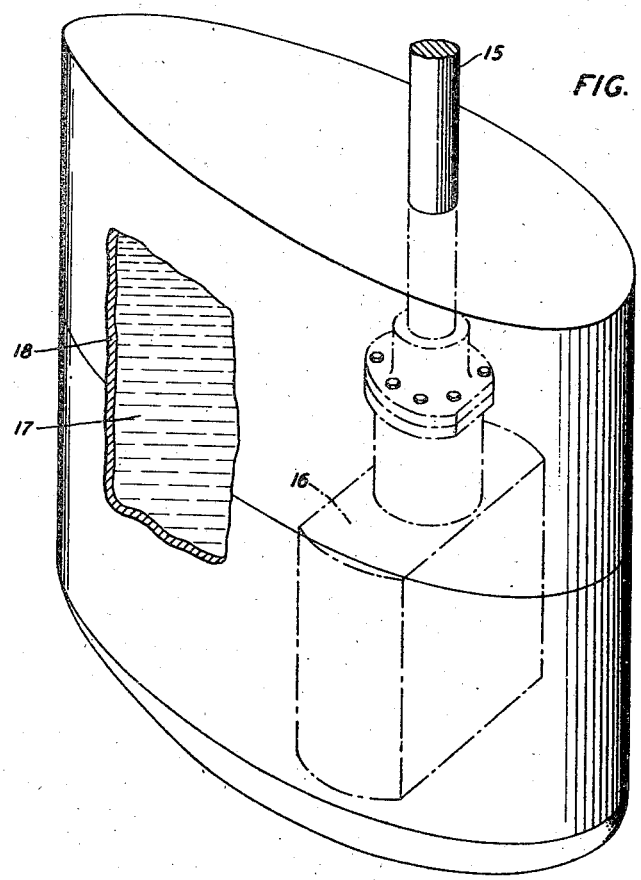
Fig. 4 is a perspective view, partly broken away of a streamlined housing.

Fig. 4 shows a streamlined device. The whole is mounted on a shaft 15 by which the projector or hydrophone may be lowered or raised or rotated in any desired position. The apparatus 16 represents the transducer which is immersed in castor oil 17 and covered by a housing 18, which as before, is a plastic of considerable mechanical strength but having practically the same transmission characteristics as the castor oil 17 and the sea water in which the whole is immersed.

The nature of the plastics will be understood by noting that materials such as polystyrene, various forms of methyl methacrylate, the vinyl chloride acetate resins, cellulose acetate butyrate and certain of the polyesters may be employed. Of these the cellulose acetate butyrate and the polyesters give the closest match to sea water.

An alternative method which requires a smaller amount of plastic for the same strength is to mold the plastic around an expanded metal frame somewhat after the fashion shown in Fig. 3. The metal frame provides greater mechanical strength, while still allowing free transmission through the large openings in the metal which are filled with sound transparent plastics.

What is claimed is:

In combination, an electromechanical transducer, non-corrosive liquid having the same impedance characteristics as water in which said transducer is immersed and a thin wall housing for retaining said liquid, said housing being of a plastic and also having the same impedance characteristics as water.

WARREN P. MASON.

REFERENCES CITED

The following references are of record in the file of this patent:

UNITED STATES PATENTS

| Number | Name | Date |
|---|---|---|
| 2,141,752 | Hoarle | Dec. 27, 1938 |
| 2,015,674 | Hayes | Oct. 1, 1935 |
| 1,490,742 | Hull | Apr. 15, 1924 |
| 2,147,649 | Haines | Feb. 21, 1939 |
| 1,348,538 | Blake | Aug. 3, 1920 |

FOREIGN PATENTS

| Number | Country | Date |
|---|---|---|
| 304,173 | Great Britain | Feb. 14, 1929 |